United States Patent [19]
Burke et al.

[11] Patent Number: 5,423,041
[45] Date of Patent: Jun. 6, 1995

[54] COUPLING RULES TO AN OBJECT-ORIENTED PROGRAM

[75] Inventors: Fred H. Burke, Round Rock; Keith O. Carlson, Austin; Richard C. Roth, Georgetown, all of Tex.

[73] Assignee: Texas Instruments Incorporated, Dallas, Tex.

[21] Appl. No.: 590,108

[22] Filed: Sep. 28, 1990

[51] Int. Cl.⁶ ............................................. G06F 9/45
[52] U.S. Cl. ........................ 395/700; 364/DIG. 1; 364/280.4
[58] Field of Search .................. 364/DIG. 1; 395/62, 395/77, 908, 600, 700

[56] References Cited

U.S. PATENT DOCUMENTS

| | | | |
|---|---|---|---|
| 4,908,778 | 3/1990 | Moriyasu et al. | 364/DIG. 1 |
| 4,924,408 | 5/1990 | Highland | 364/DIG. 1 |
| 4,930,071 | 5/1990 | Tou et al. | 364/DIG. 1 |
| 5,038,296 | 8/1991 | Sano | 364/DIG. 1 |
| 5,084,813 | 1/1992 | Ono | 364/DIG. 1 |
| 5,101,491 | 3/1992 | Katzeff | 364/DIG. 1 |

OTHER PUBLICATIONS

Miranker, Brant, Lofaso and Gadbois, "On the Performance of Lazy Matching in Production Systems", scheduled to appear in 1990 in Proceedings of the Eighth National Conference on Artificial Intelligence (AAAI 90).

Primary Examiner—Thomas M. Heckler
Attorney, Agent, or Firm—W. Daniel Swayze, Jr.; Richard L. Donaldson

[57] ABSTRACT

A method of coupling rules to a data domain of an object-oriented computer program. During run time, the coupling permits the computer to use rules to directly access user-defined objects for both the matching and the action phases of the inferencing process. Inferencing is implemented with an inference class object and user-defined class object are derived from a working memory element class.

9 Claims, 6 Drawing Sheets

COUPLING RULES TO AN OBJECT-ORIENTED PROGRAM

TECHNICAL FIELD OF THE INVENTION

This invention relates to computer programming, and more particularly, to a method of coupling a system of rules to a data domain developed with object-oriented programming.

BACKGROUND OF THE INVENTION

As a way of differentiating object-oriented computer programming from function-based programming, the former is a method of structuring programs so that a particular type of data and the parts of a program that operate on the data are combined. The latter is characterized by the use of functions that receive control of the computer processing when called and operate on data passed to them. Thus, objects are represented by both facts about them and the functions that process these facts.

Another approach to programming is rule-based programming, in which rules define premise-action pairs. Actions are carried out when data exist that meet the condition specified in the premise. Like functions, rules operate on data, but are triggered when certain data exist rather than being called by another part of a program. Rule-based programming is especially useful for applications that must determine what action to take, based on certain facts.

Existing rule-based application programs are developed from stand-alone rules systems, and reason on the basis of internally defined data structures. The programmer is constrained to use the data structures provided by the rules system. Data derived externally from the rule system must be reformatted into a format specified by the rule system before it can be evaluated by the rule system.

One method of using a rule system with object-oriented programming is to reformat and copy the data structures of the object-oriented program to the data structures of the rule system. The disadvantage of this method is the cost in terms of time and memory.

It would be advantageous if programmers could develop a problem domain using general and standard object-oriented programming languages, and then develop rules to inference from that domain. Ideally, the rules could be directly coupled to an object-oriented application program, and the need to modify the application program would be minimal.

SUMMARY OF THE INVENTION

One aspect of the invention is a method of programming a rule system to inference directly on objects of an object-oriented language program. A programmer writes an application program in the object-oriented language, which has a data domain that creates, uses, and modifies class instances in the usual manner prescribed for that language. The programmer then codes rules, which having a premise and an action and whose premise refers to a user-defined class on which the rule will inference. The programmer also codes a special header for each user-defined class to be inferenced from, such that the user-defined class inherits from a working memory element class. Finally, the programmer inserts a rule calling sequence in the object-oriented program, which defines an inference class, binds an inference class object to a rule, adds user-defined class instances to a working memory element class, and calls an inferencing process. The rules are compiled with a rules compiler, which generates code in the object-oriented language. That code is then compiled and linked into the application program.

Another aspect of the invention is a method of using a computer for rule inferencing on user-defined objects of the data domain of an object-oriented program. The computer invokes at least one rule from the object-oriented program and instantiates the rule as an inference class object. The computer inherits at least one user-defined object to be used by the rule for inferencing from a working memory element class, and instantiates this user-defined object. The computer then calls an inferencing process, such that a matching step of the inferencing process directly accesses the user-defined object via the working memory.

A technical advantage of the invention is that a rules system may be developed for inferencing from a standard object-oriented data domain. For program development, the coupling of the rules to an object of an application program is accomplished by simple modifications to the application program. The coupling between the rules and the objects upon which the rules inference is direct, without the need for reformatting and copying data structures.

DETAILED DESCRIPTION OF THE INVENTION

General Features of the Invention

The invention is written in C++, an object-oriented programming language, as a C++ preprocessor and a runtime library module, which may be integrated with other C++ components. The rules match against and manipulate C++ classes.

Although this description is in terms of C++, the basic concepts of the invention may be used with other object-oriented programming languages. In most general terms, the invention is a rule system and an interface that permits the rule system to operate directly on class instances created with an object-oriented language. The methods described herein could be readily adapted to languages such as Common Lisp Object System and Smalltalk. As explained below, a characteristic of the object-oriented language is that it provide run time typing.

As used herein, "object-oriented program" refers to a program written in an object-oriented language. This program is assumed to include classes that may be instantiated to become objects, using C++ terminology, or analogously, to include some other means of knowledge representation that permits the processing of objects and inheritance of object attributes. For examples, the classes of C++ and Smalltalk are analogous to "frames" of other object-oriented languages. "Application program" refers to the programming that results when the object-oriented program is coupled with a rule system in accordance with the invention. From a system architecture point of view, the application program is composed of three parts: at least one set of if-then rules, a collection of user-defined objects, and an inference engine.

As will be explained below, the rules are prepared in accordance with the rules programming method of the invention, which has general features in common with the OPS family of production system languages, such as OPS5. Like OPS5, the rules system is data driven and forward chaining. The rule language supports pattern variables and relational predicates. However, the rules syntax is derived from both C++ and OPS5, and as such, permits the expression of more general pattern predicates than OPS5. The rule language permits programmers to imbed simple computations in the predicate, and if that is not sufficient, the programmer may design a pattern predicate. The action part of a rule contains procedural code, which may be code in the language of the object-oriented program and may include functions supported by the language of that program.

The rules system is designed so that after compilation and linking with the object-oriented program, the application program has global control of the inferencing process. Sets of rules are organized as rule-sets. Inferencing is initiated from the application program. Within a rule-set, an application programmer may assign each rule a priority. If multiple rules are satisfied at the same time, the rule with the highest priority is selected for firing.

The inference engine of the rules system executes the match, select, and act phases of the inferencing process. The inference engine uses a number of functions and data structures, which are described throughout this patent application.

An important feature of the invention is that the inference engine is implemented as an inference object. For purposes of example herein, the class from which this inference object is instantiated is called Rule_Set. The behavior of an instance of Rule_Set is determined by a rule-set that is used to initialize the instance and a set of working memory elements. There can be more than one instance of Rule_Set initialized with the same rule-set.

Each rule-set has its own working memory, which is also implemented as an object, and is a subset of the user-defined class instances in the application program. The inference engine determines and updates the state of the working memory, using the same member functions that appear in the programmer's class definitions. Thus, the rules may pattern match against any C++ data type or object. The instances on which a rule-set inferences and manipulates may be different each time a rule-set is invoked.

During its match phase, the inference engine tests each rule's premise against the current working memory. It enumerates the rules and how they are satisfied. It creates instantiations, which are pairs containing the name of a satisfied rule and an ordered set of class instances that satisfy the rule. In the preferred embodiment, the rule system uses a matching algorithm known as a "lazy match", which does not fully enumerate rules in each cycle Other matching algorithms, known in the art of rules systems, may be used.

In the select phase, the inference engine selects one of the instantiations, which is fired. The inference engine selects this instantiation by first using rule priority provided by the programmer. If two rules are satisfied at the same time, the instantiation of the rule with the higher valued priority wins. Rules for which no priority is declared default to priority 0.

During the action phase, the inference engine executes the actions specified in the "then" part of the rule. These actions may update the working memory by creating new objects and modifying and removing old objects. The cycle continues until no rules are satisfied or until an action explicitly halts execution.

Programming the Rules System

Figure 1:
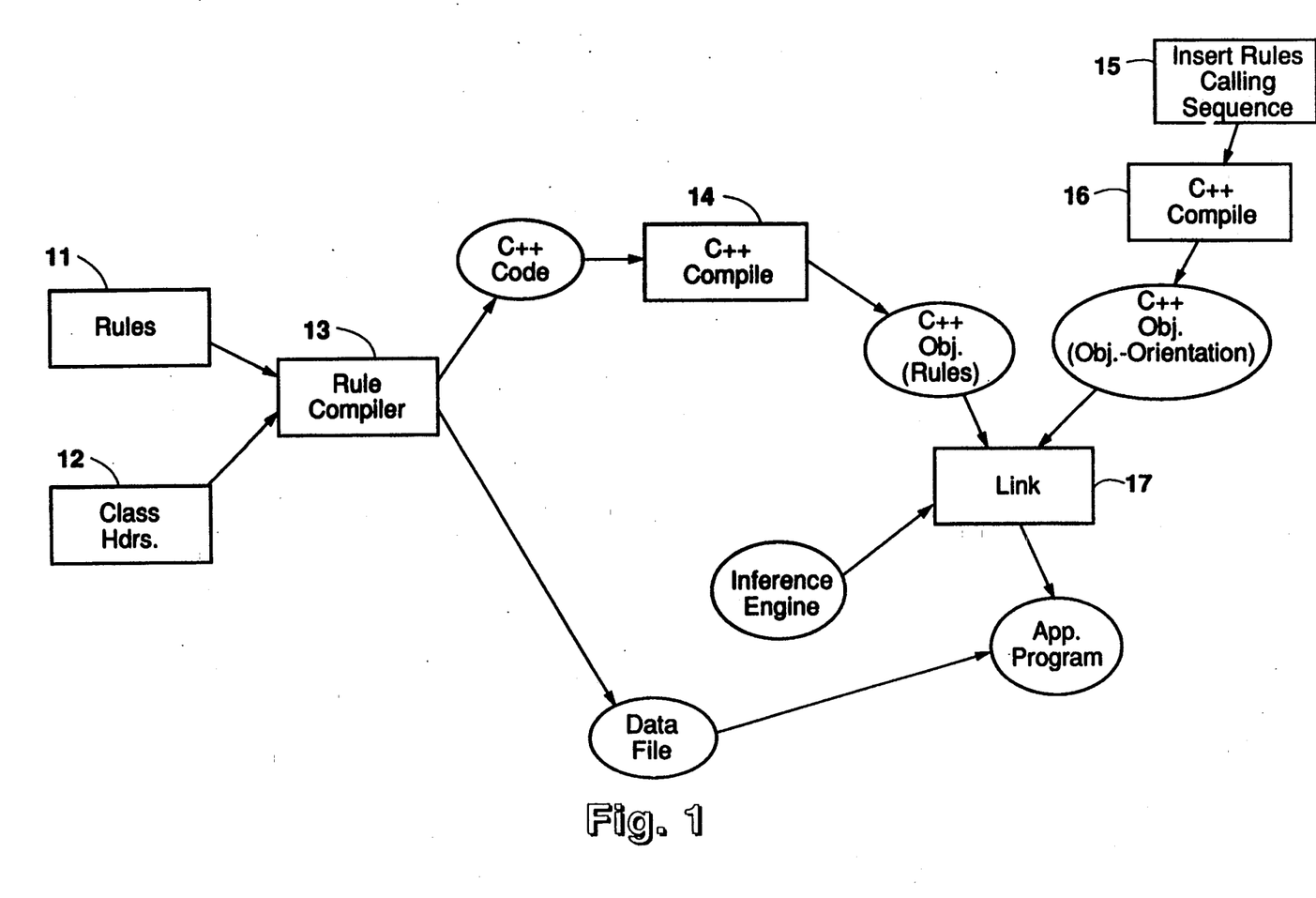
FIG. 1 illustrates the process of programming an application program.

FIG. 1 and this section of the patent application provide an overview of the method of programming a computer by developing rules and modifying an object-oriented application program. Although this section briefly describes each step of the method, subsequent sections of this patent application describe steps 11, 12, and 15 in further detail.

Step 11 is coding a system of rules. Rules are entered into rule-set files, using a text editor. A rule-set file has three parts. The first part specifies the include declarations, which define the classes used by the rule-set, the ancillary functions and predicates, and the types used by the rule-set. The second part is a declaration of the name of the rule-set. The third part specifies the rules.

Step 12 is modifying the user-defined class object definitions so that they will interface with the rules. This step includes the creation of class headers, so that each user-defined object inherits from a working memory element class.

In step 13, the rule-set file and the class headers are translated to generate rules code in the object-oriented language. This translation step is accomplished with a rules compiler. Step 13 includes generating a data file, which is used at run time to provide information, such as rule dependencies, used by the inference engine.

In step 14, the rules code is compiled with a standard C++ compiler to generate object code.

Step 15 is inserting certain rules calling sequences in the object-oriented program to initiate the inferencing process. The object-oriented program has a data domain from which the rules will inference, comprised of user-defined class objects.

Step 16 is compiling the object-oriented code, as modified in step 15, and in step 12.

In step 17, the collection of object files are linked and loaded, using conventional C programming tools. As indicated in FIG. 1, the rules object code is linked with the object code of the object-oriented program and with code representing the inference engine. The result of the steps illustrated in FIG. 1 is an application program, which as explained above, has at least one set of rules, a collection of user-defined objects, and an inference engine.

Rules Development

In the following description, a user-defined class, Cell, is used to illustrate a bacteria simulation. The state of a cell is determined by its position in an x,y grid, the generation, and whether there is a living bacteria at that position and time. Each cycle of the simulation represents a generation. Four accessor functions are provided to return the state of the cell. An example of a class definition of Cell is set out in the next section.

The following example is of a rule, has_right_neighbor, that will inference on Cell. The rule has three parts:

a header, a premise, and an action. Optionally, the first part of the rule body may also include a declaration of priority. The syntax of the rule is much like that of a C++ function, without any explicit arguments. The body of the rule is delimited by curly brackets, as are the premise and the action.

```
rule has_right_neighbor()
{
    priority 7;
    premise
    {
        Cell x() <x>, y() <y>, generation() <gen>,
            alive() TRUE;
        Cell x() {<x> + 1, y() <y>,generation()
            <gen>, alive() TRUE;
    }
    action
    {
        {cout << "the cell at ", << <x>, << <y>,
            << " has a living right neighbor";};
    }
}
```

Each condition element within the rule's premise includes the name of a class from which the rule will inference, which in this example is Cell. The premise is formed by the keyword premise.

Any number of condition elements follow the premise keyword. Each condition element is separated by a semicolon. The first identifier in the condition element specifies the class, which is followed by any number of accessor-value pairs separated by commas. Any accessor function that is defined for the class may be used. A condition element may be a pattern constraint on a class or a user-defined predicate.

The following example is of a premise having two pattern constraining condition elements:

```
premise
{
    Cell x() 0, y() 0, alive() TRUE;
    Cell alive() TRUE, generation() > 1000;
}
```

In this example, the first condition element is satisfied if there is some class instance of Cell in the working memory whose accessor functions x(), y(), and alive() return 0, 0, and TRUE. The second condition element is satisfied if there are any cells that are alive after 1000 generations.

Any legal C relational predicate is allowed. They are:

==, !=, >, >=, <, <=

In the case of noncommutative binary predicates, the argument for the left side of the predicate is derived from the working memory using the accessor function. The argument for the right side of the predicate is the value returned by the expression in the condition element. The expression may be a constant, a variable, or the value returned by the C++ expression.

Pattern variables are distinguished by the use of angle brackets, i.e., <pat_var>. The first appearance of a pattern variable in a rule binds the variable to the value returned by the accessor function. As the inference engine searches through the working memory, the variable may be bound to the value present for each instance of the class that has been passed to the rule-set.

The scope of a pattern variable is limited to the rule in which it is bound.

In the has_right_neighbor rule example set out above, the pattern variables <x> and <y> will bind to each cell in the bacteria simulation for which "alive" is true. The rule is satisfied for two cells in the same row, and those two cells are one column apart, and the generation is the same. This is expressed in the rules system language as binding <y> to the same row value for two cells, and specifying that one cell is at location <x> and the second is at position {<x>+1}.

Any valid C++ expression is permitted in the value field of a condition element. Bound pattern variables may be embedded within the C++ expressions.

The value returned by an accessor function may be required to satisfy a number of constraints. Below are two premises of two different rules. The first is satisfied if a cell holds a living bacteria, and that same cell held a living bacteria sometime earlier but not at initialization (generation=0). The second is satisfied if a cell has either a left neighbor or a right neighbor.

```
rule lives_two_cycles_after_start
{
    premise
    {
        Cell x() <x>, y() <y>, generation() <gen>,
            alive() TRUE;
        Cell x() <x>, y() <y>, generation() < <gen>

!= 0, alive() TRUE;
    }
    ...
} rule has_left_or_right_neighbor()
{
    premise
    {
        <cell>:Cell x() <x>, y() <y>, generation() <gen>,
            alive() TRUE;
        Cell x() {<x> + 1} | | {<x> - 1}, y() <y>,
            generation() <gen>, alive() TRUE;
    }
    ...
}
```

The class instances that are matched and bound to a condition element may be labeled using a condition element variable. In the example above, the condition element variable <cell> is used to identify, to the rule's action, the class instance that matched that condition element in the premise. Condition element variables can also be used as additional pattern constraints. The value of a condition element variable is a pointer to the bound class instance. Thus, condition element variables can be used to guarantee that two condition elements match two different class instances.

In the next example of a rule, the rule is satisfied if a cell has any neighbor, left, right, up, down, or diagonally. The first condition element binds pattern variables <x> and <y> to the x,y position of a cell. The second condition element is satisfied by any cell that is within +1 or −1 of the position of the cell bound to the first condition element. However, the cell that is bound to the first condition element will also satisfy the second condition element unless the programmer provides more specificity. One means of providing specificity is to test the condition element variables and verify that they are bound to different cells. Because in any one generation, there is only one instance of cell per x,y position, this test assures that the same cell is not used to satisfy both condition elements.

```
rule has_some_neighbor( )
{
    premise
    {
        <cell1>: Cell x() <x>, y() <y>, generation()
                <gen>, alive( ) TRUE;
        <cell2>: Cell x() <x> | | {<x> + 1} | |
        {<x> - 1}, y() <y> | | {<y> + 1} | |
            {<y> - 1}, generation() <gen>, alive( )
TRUE,               <cell1> != <cell2>;
    }
    ...
}
```

As stated above, user-defined predicates are another type of condition element that may appear in the premise of a rule. The predicate must have return type Boolean. All the pattern variables used as arguments to the predicate must be bound. The predicate must have been declared extern and made available to the C++ compiler via an include file specified in the rule-set file.

As an example of user-defined predicates, the rule premise above may also be expressed as follows:

```
Boolean neighbor_p (int x1,int y1,int x2,int y2,Cell
    *cell1, Cell *cell2)
    {return (((x1 == x2) | | x1 == (x2 + 1) | | x1 == (x2 -
1))     && ((y1 == y2) | | y1 == (y2 + 1) | | Y1 == (y2 -
1)) &&   cell1 != cell2));
    } rule has_some_neighbor( )
{
    premise
    {
        <cell1>:   Cell x() <x1>, y() <y1>,
generation()         <gen>, alive( ) TRUE;
        <cell2>:   Cell x() <x2>, y() <y2>,
generation()         <gen>, alive( ) TRUE;
        neighbor_p(<x1>, <y1>, <x2>, <y2>,
            <cell1>, <cell2>);
    }
    ...
}
```

As indicated above, the rule system permits the use of C++ code in the action part of the rule.

```
rule action_example( )
{
    premise
    {
        Cell x() max <grid_size>;
    }
    action
    {
        int i;
        for ( i = 0; i < <grid_size>; i++)
        {
            make (Cell, i, i, 0, TRUE);
        }
    }
}
```

The action of a rule acts like a C++ function of type void. The parameters to this function are the condition element variables used in the premise of the rule. The values of these parameters are the values bound to those variables by the instantiation that has been selected for firing. The bound variables may then be used in any appropriate code of the action. The rule system will substitute the correct values into the action when the rule is fired.

The rule system provides several functions that can be embedded in a rule's action and used to manipulate the class instances that form the working memory. The make() function creates and initializes a new instance of a named class by calling the class's constructor and passing it the list of arguments. The newly created class instance becomes part of the current rule-set's working memory. An example of the function call for make() for the named class, class_id is:

make (class_id, argument_list);

A remove() function removes a class instance from working memory, but does not free the instance's memory. The deletei() function removes a class instance from working memory and then calls the class's destructor. Examples are:

remove (<ce_var>);

deletei (<ce_var>);

The modify() function updates the specified values of the class instance that was matched by the premise. The particular class instance is identified by a condition element variable. The inference engine is notified that the class instance has been altered and the matcher must update its internal state to be consistent with those changes. Also, a halt() function, callable from the action function, may be used to terminate execution of the rule-set and return control to the calling program with a return value of False. The rule-set may be re-invoked and the execution continued from the next selected instantiation.

An example of the use of make(), modify(), remove(), and halt() is set out in the following rule example. The rule finds a position with a living cell for two successive generations, creates a new living cell for a third generation, kills the second generation cell, removes the first generation cell from working memory, and stops the execution.

```
rule action_examples( )
{
    premise
    {
        <cell1>: Cell x() <x>, y() <y>, generation()
                <g1>, alive( ) TRUE;
        <cell2>: Cell x() <x>, y() <y>, generation()
                {<g1> + 1}, alive( ) TRUE;
    }
    action
    {
        make (Cell, <x>, <y>, {<g1> + 2}, TRUE);
        modify (<cell2>, alive( ) FALSE);
        remove (<cell1>);
        halt( );
    }
}
```

User-Defined Class Headers

To set up the user-defined objects for use by the rules system, the programmer modifies their class definitions so that they inherit from a working memory element class. As explained below, by inheriting from the working memory element class, the rules system can determine at run time the class type of a given instance. Thus, although the invention is not dependent on a particular object-oriented language, a characteristic of the language is run time type checking.

In the preferred embodiment, the rules system has two working memory element classes, which provide flexibility in the manner in which the rules system uses user-defined objects. The two classes, Wme_All and Wme, are the same, except for the manner in which they make data available to the rules system.

The Wme_All class provides a means for the programmer to specify that all instances created for this class be made available for inferencing. Thus, the programmer can simply specify that a class be derived from Wme_All, and then each instance of that class will be available for the rule system to inference from, The Wme class is provided for those cases in which only selected instances of a user-defined object are to be made available for inferencing. These two means for passing user-defined class instances to a rule set via a working memory are referred to herein as implicit and explicit passing, respectively.

Both classes provide the rules system with a means for associating a time stamp with a user-defined class object. They also provide a means for tracking various state information. Both classes use a list called the External Input Port (EIP), which is a global structure that holds all data that is to be made available at inference time.

When a class instance derived from Wme_All is created, the constructor for the Wme_All class is called. This constructor puts a pointer to the newly created user-defined class object onto the EIP. In addition, any time a destructor is called on a user-defined class object that is derived from Wme_All, the destructor for Wme_All ensures that if that data is on the EIP, it will be removed.

When a class instance is derived from Wme, two global functions enable the application developer to selectively add and remove data from the EIP. These two functions are add_to_eip() and remove_from_eip(). Each of these functions takes a pointer to an object that has been derived from Wme. Thus, in the application program, when an item of data is needed by the rules system, the application program should call the add_to_eip() and pass the pointer to that data. Both of the functions may be called from anywhere within the application program, including from within the action of a rule.

The following example is of a user-defined class, Cell, derived from Wme:

```
class Cell: public Wme
{
private:
    int c_xm c_y, c_generation;
    Boolean c_alive;
public:
    int x();
    int y();
    int generation();
    Boolean alive();
    cell();
    not cell();
}
``` where cell() is a constructor and not cell() is a destructor. As is usual in C++ programming, the class has private and public data and methods or functions that may be called. At run time, Cell is instantiated to create an object. The derivation from Wme makes this object available for inferencing.

Rule Calling Sequences

Figure 2:
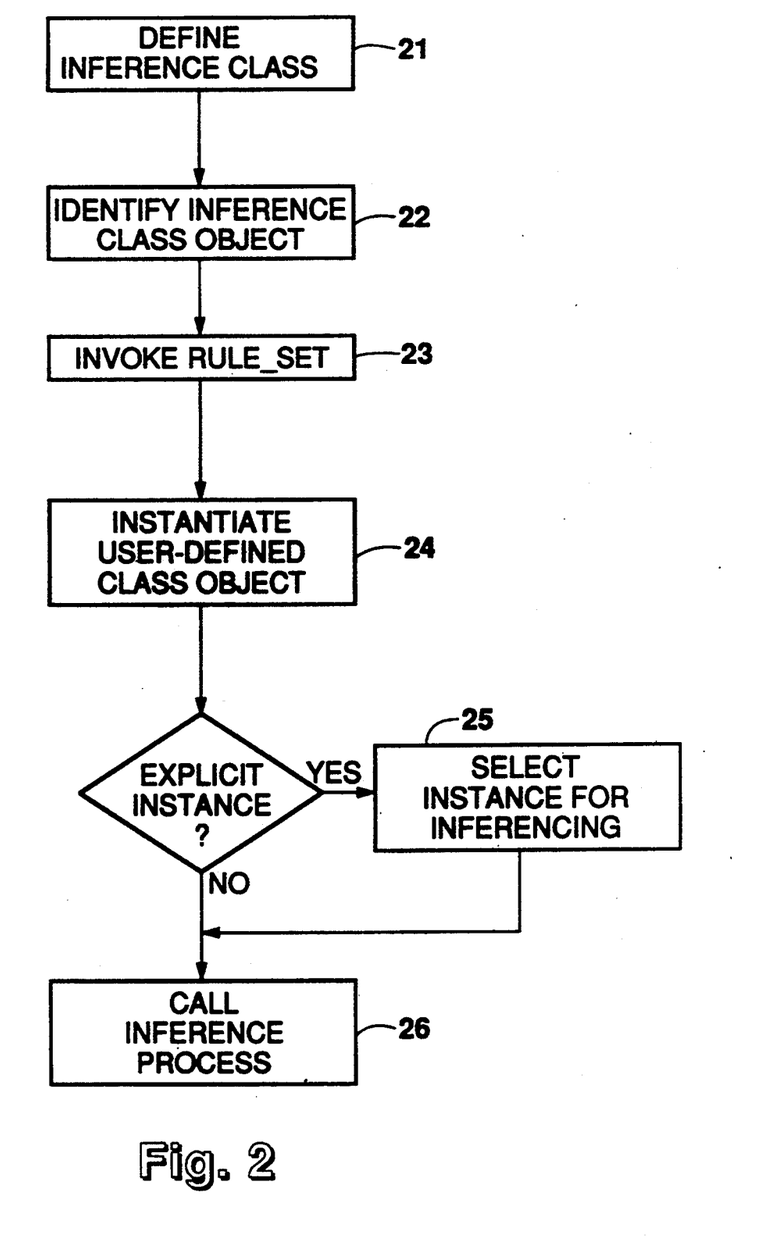
FIG. 2 illustrates the process of using a computer for rule inferencing directly from an object-oriented data domain.

FIG. 2 illustrates the run time process of using a computer to couple rules to an object-oriented program. To use the invention to perform this coupling, a program developer inserts a rule calling sequence into the object-oriented program.

The following example is of a rule calling sequence that uses the Wme class to explicitly pass user-defined object instances to a rule-set.

```
# include <LAMPS/lamps.h>
main()
{
Rule_Set *my_rule_set;
Generic *wme_list;

// any C++ application code my_rule_set = new Rule_Set;
my_rule_set -> init_infer("life");
my_rule_set -> add_to_eip (new Cell (1,1,0,TRUE));
my_rule_set -> inference();

// and C++ application code

}
```

As illustrated in the above example, and by step 21 of FIG. 2, an included header defines the inference class Rule Set. In step 22, an instance of Rule_Set is identified and initialized.

Step 23 is invoking a rule-set object, which can occur at any time from within C++ code or from other rule-set objects. When a rule-set is invoked, the particular set of instances that form its initial working memory are specified. A file containing a set of rules, such as the rule-set file described above, initializes a rule-set object.

In the above example, memory is allocated for an instance of Rule_Set using new, as with any C++ object. The rule-set is initialized by passing the name of a set of rules to the instance, using an init_infer() function. In the example, my_rule_set is bound to the rule-set called life.

Step 24 instantiates the user class. In step 25, user-defined class instances are marked for use by the rule-set using the add_to_eip() function. As explained above, this function explicitly adds an object to the working memory of a rule-set. An alternative embodiment includes all instances implicitly. Thus, step 26 depends on whether the instance is to be derived explicitly or implicitly.

In step 26, an inferencing process is invoked by calling inference(), which returns a Boolean value. A return value TRUE means that inferencing terminated when there were no longer any satisfied rules. A return value FALSE means the inferencing terminated when a halt() function was executed in the action of a rule.

Illustrative Inference Engine Data Structures

FIGS. 3-6 illustrate various objects used by the computer at run time to connect user-defined objects of an object-oriented program to the rules. The particular data structures described herein are an illustrative example of implementing the inference engine, using the inference class and the working memory element class described above, as well as classes representing condition elements and rules.

In this section of the patent application, for purposes of example, the inference class is designated as Rule-Set as in the preceding sections. The user defined class instance that is derived from the class Wme or Wme__All is pointed to by the Alpha Directory Element or ADE. The condition element and rules objects are designated Cond__Elem and Rules, respectively.

Included within FIGS. 3-6 are a number of vectors and tables. The zeroth entry of each is set to zero, thus the first entry is at index one. This explains why certain values in the description below seem to be offset by a value of one.

Because an object of the Rule-Set class is associated with a rule-set, "rule-set" as used below refers to the current rule-set. Likewise, because an object of the Rules class or Cond__Elem class is associated with a particular rule or condition element, respectively, "rule" and "condition element" refer to the current rule and the current condition element.

Figure 3:
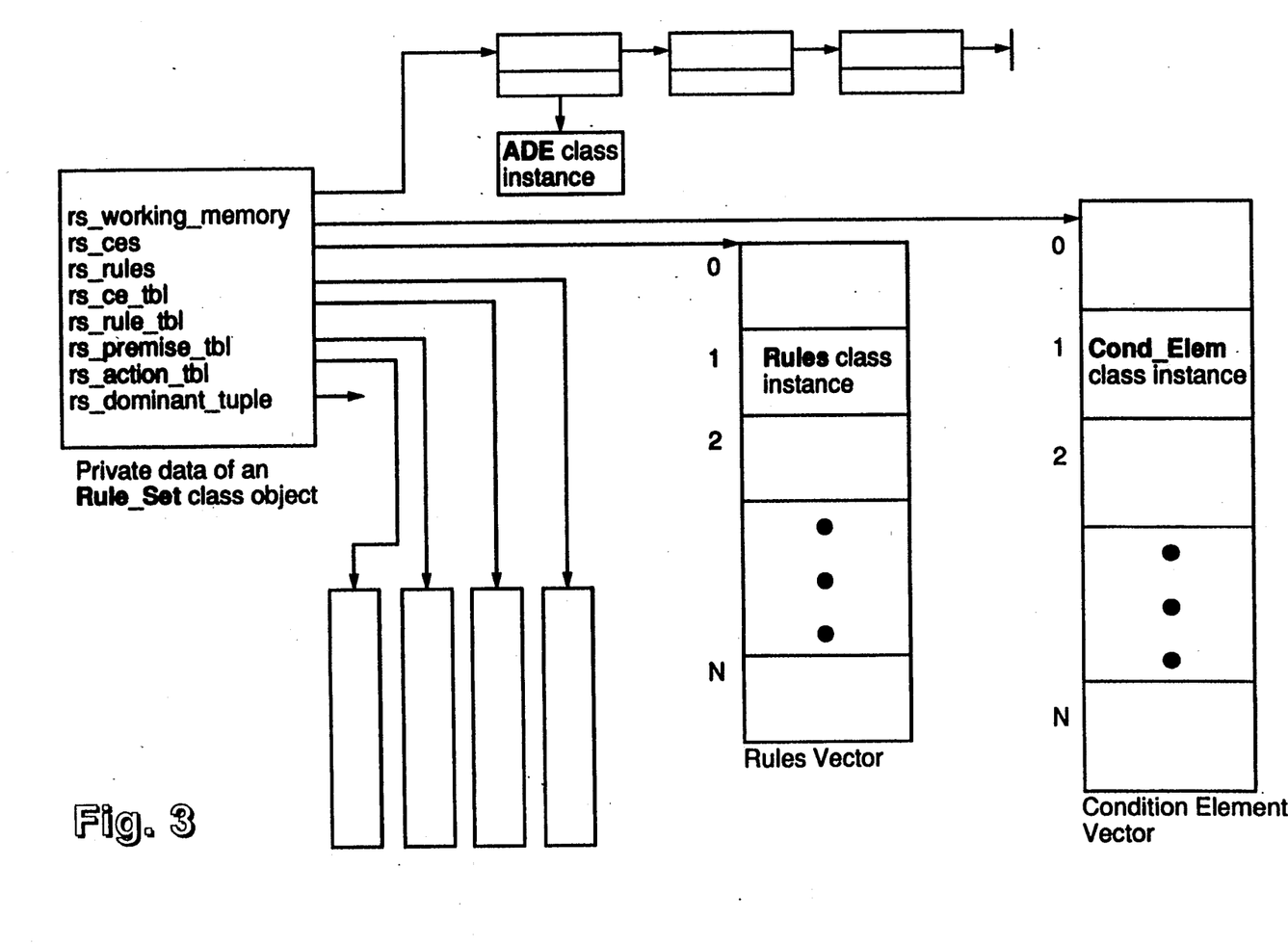
FIG. 3 is a diagram of an inference object and objects that comprise it.

FIG. 3 illustrates the inference class object, designated Rule-Set, which is created at runtime by the application program, for each rule-set that the application program uses. Once created and initialized, Rule-Set contains both the code and data needed to perform a forward chaining rule evaluation.

Rule-Set has the following private data elements:

The rs__working__memory field is a pointer to a linked list. Each element of the linked list contains a pointer to an instance of the ADE class, which is explained below in connection with FIG. 4. All data on this list is what working memory is defined to be and is in descending time stamp order.

The rs__ces field is a pointer to a vector of instances of the Cond__Elem class. Each condition element instance reflects information about a particular condition element within the premise of a rule. Therefore, this vector contains data for each of the condition elements that make up all the premise of all the rules in the rule-set.

The rs__rules field is a pointer to a vector of instances of the Rules class. The vector contains the needed information about the premise and action of each rule in the rule-set.

The rs__ce__tbl field is an array of condition element indices. The format of the data in the table is that of many zero-terminated lists of condition element indices placed back to back. Each instance of the Rules class in the Rules vector attached to the rs__rules field has an r__ce__index field that indexes into this table. At that point in the table, starts a zero-terminated list of all condition element indices that make up the premise of the rule.

The rs__rule__tbl field is an array of rule indices. The format of the data in the table is that of many zero-terminated lists of rule indices placed back to back. Each instance of the Cond__Elem class in the Cond__Elem vector attached to the rs__ces field has a ce__rule__ndx field, which is an index into this table. At that point in the table, starts a zero-terminated list of all the rule indices that use this condition element.

The rs__premise__tbl is an array of the address of each executable procedure associated with each condition element. Each instance of the Cond__Elem class in the Cond__Elem vector attached to the rs__ces field has a ce__premise__ndx field, which is an index into this table. There is only one index per condition element.

The rs__action__tbl field is an array of the address of each executable procedure associated with the action of the rule. Each instance of the Rules class in the Rules vector attached to the rs__rules field has a r__action__ndx field, which is an index into this table. There is only one index per rule.

The rs__dominant__tuple field contains the pointer to the current dominant tuple. The phrase "dominant tuple" refers to the ADE instance that currently has the numerically largest time stamp of all the as yet unprocessed ADE's. Once an ADE has been processed, i.e., it has become a dominant tuple and all the rules that use the condition element it is attached to have been tested, it cannot be selected as a dominant tuple again.

Figure 4:
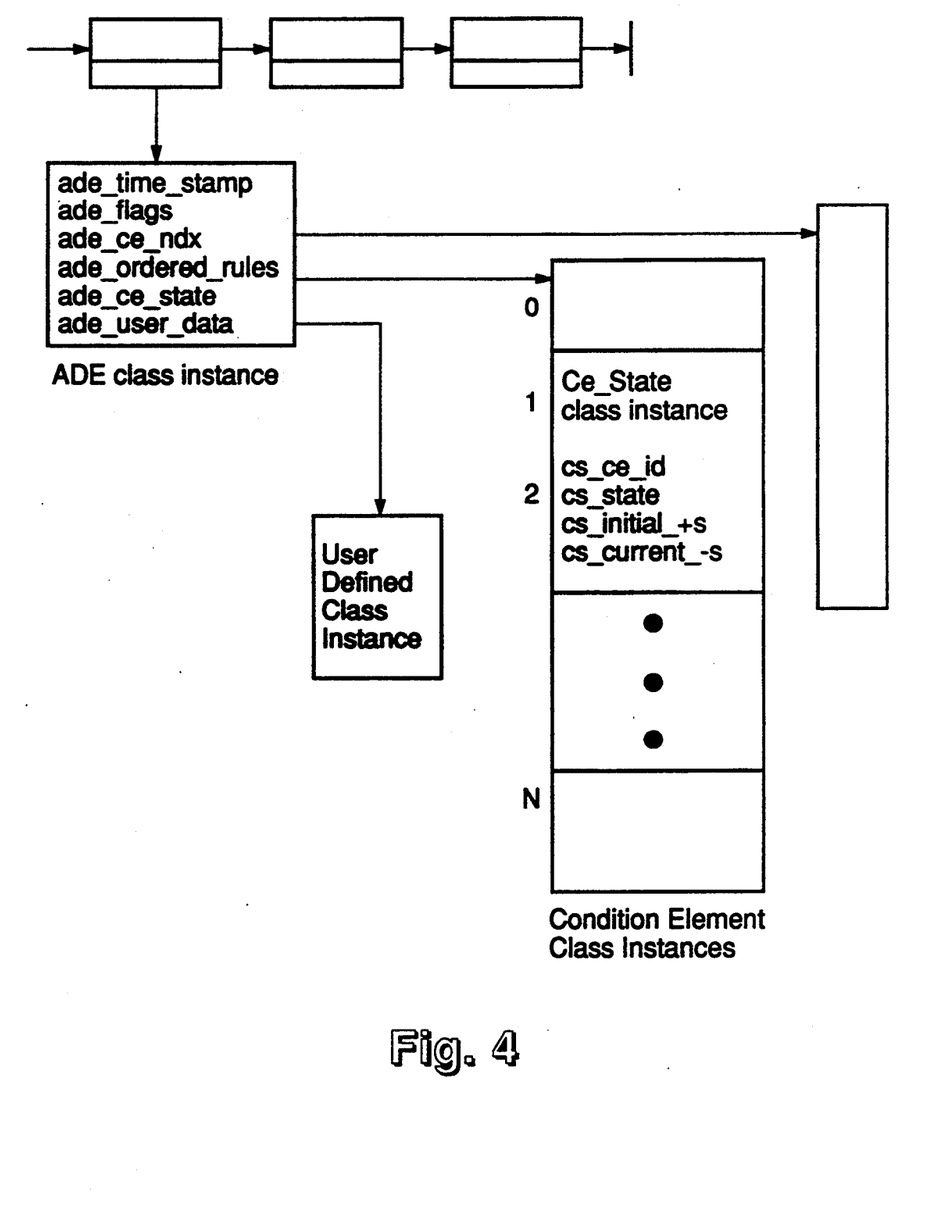
FIG. 4 is a diagram of an Alpha Directory Element, which points to a user-defined class instance derived from a working memory element class.

FIG. 4 illustrates the ADE class. It is through ACE instances that the system has the ability to access instance data from user-defined object classes. Each of the following fields is a private element of ADE:

The ade__time__stamp field is set by the system so that each item of user data has a unique identifier (id). The value assigned by the system to any given ADE is the next available integer in a sequence.

The ade__flags field contains bits used to represent the state of a flag.

The ade__ce__ndx field has a value that represents the index into the Condition Element vector for the condition element to which this ADE is assigned. If the data is appropriate for more than one condition element, another ADE is created to point to the same user data and that new ADE is linked into the condition element's alpha list.

The ade__ordered__rules field is given a value only once during the lifetime of the ADE. This occurs when the ADE becomes the dominant tuple. The value will be a pointer to a vector of rule id's. The system determines which rules need to inference on this item of data. If more than one rule does, the system determines the order in which the rules will be tried. Once the order is set, it cannot be changed for this ADE. The system processes each rule in turn. When the last rule id in the vector is processed, the vector is removed and the ade__order__rules field is set to NULL. A flag in ade__flags is set to indicate that all rules that use this data have already been processed, thus preventing this ADE from becoming a dominant tuple again.

The ade__ce__state field works in conjunction with the ade__ordered__rules field. This field is a pointer to a Condition Element state vector associated with the current rule id. As each rule is processed, the previous value of this field is deleted and a new vector is created. The vector's length is one more than the number of condition elements that make up the premise of the current rule, because the zeroth position is set to zero. The purpose of this state vector is to keep track of where the system is in processing the alpha memories associated with each condition element in the rule's premise. This field is further explained below in connection with the Ce__state class.

The ade__user__data field points to an instance of one of the user's or programmer's class instances. This class instance is derived from the Wme or Wme__All classes described above.

Referring now to the Ce__state class of FIG. 4, while an ADE is the dominant tuple, the field ade__class__state in each ADE class instance will point to its current Ce__state vector. This state information is for the rule currently being pointed to in the ade__ordered__rules vector. The Ce_state vector maintains state information about where the system is in processing the alpha memories associated with each condition element in the premise of the rule. Each condition element in the premise of the rule has an entry in this Ce_state_vector. When the system is finished matching the alpha memories against the current rule, the system will remove this vector.

A Ce_state class instance has the following four private data members:

- The cs_ce_id field holds the id of the condition element whose state information is kept in this Ce_state class instance.
- The cs_state field represents the current state in processing the alpha memories for this condition element. The cs_initial_ts field holds the time stamp of the ADE that is the first one on this condition element's ce_alpha list that has a time stamp less than the dominant tuple's. The ADE's are kept in descending time stamp order, therefore, all ADE's after the initial ADE have time stamps less than that of the dominant tuple.
- The cs_current_ts field holds the time stamp of the ADE that is current being used in the match phase.

Figure 5:
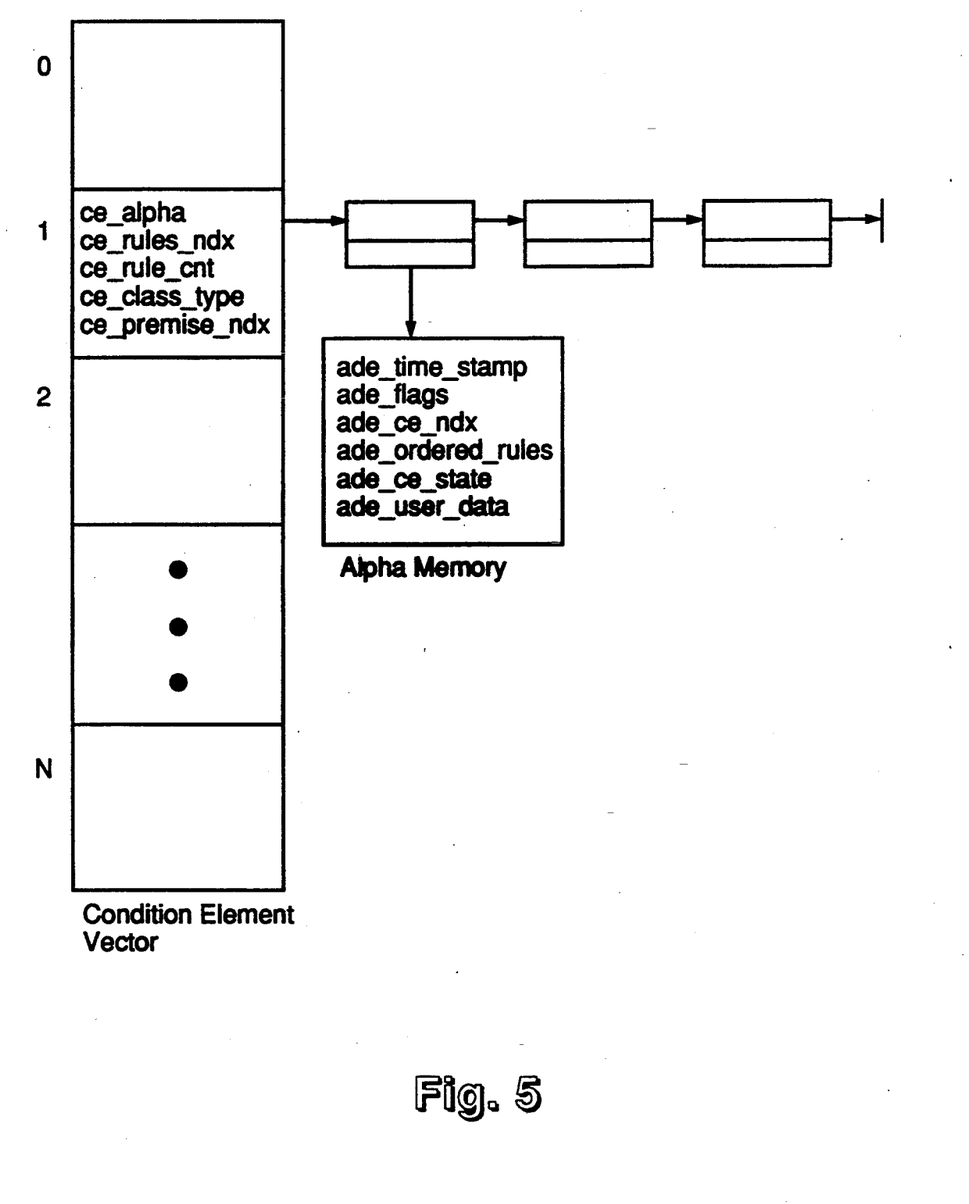
FIG. 5 is a diagram of a condition element vector.

FIG. 5 is a diagram of the Cond_Elem class and vector. The condition element vector contains a fixed number of instances of the Cond_Elem class. The number of instances is determined when a rule-set is translated during the rules translating step of FIG. 1. The space for this vector is allocated when the private member function Rule-Set::read_data() encounters the data record (A1) that holds the sizes for all vectors and tables as determined by the translator.

The following list is of the private data members of the Cond_Elem class, whose instances make up this vector.

- The ce_alpha field is a pointer to a linked list of instances of the ADE class. These instances actually exist on the linked list, rs_working_memory, within the Rule-Set class object. Therefore, each node in the ce_alpha list points to an already existing ADE class instance and its associated data.
- The ce_rules_ndx field is an index into the table rs_rule_tbl, which is within the Rule-Set class object. At this index point in rs_rule_tbl, starts a zero terminated list of rule id's that use this condition element within their premise. At minimum, there is one rule id followed by a zero.
- The ce_rule_cnt field represents the number of rules that use this condition element.
- The ce_class_type contains either the index to the next condition element of the same class type as this condition element, or a zero if it is the last one in the list. When the translator translates the rule-set, it ensures that condition elements for each class type are linked. The Rule-Set::read_data() private member function encounters a record in the data file, which contains the names of each class type and the index to the first one of that type in the Condition Element vector.
- The ce_premise_ndx field is the index into the rs_premise_tbl of the Rule-Set class object. At this index within this table is an index to the address of the function that, when branched to, executes the code associated with this condition element.

Figure 6:
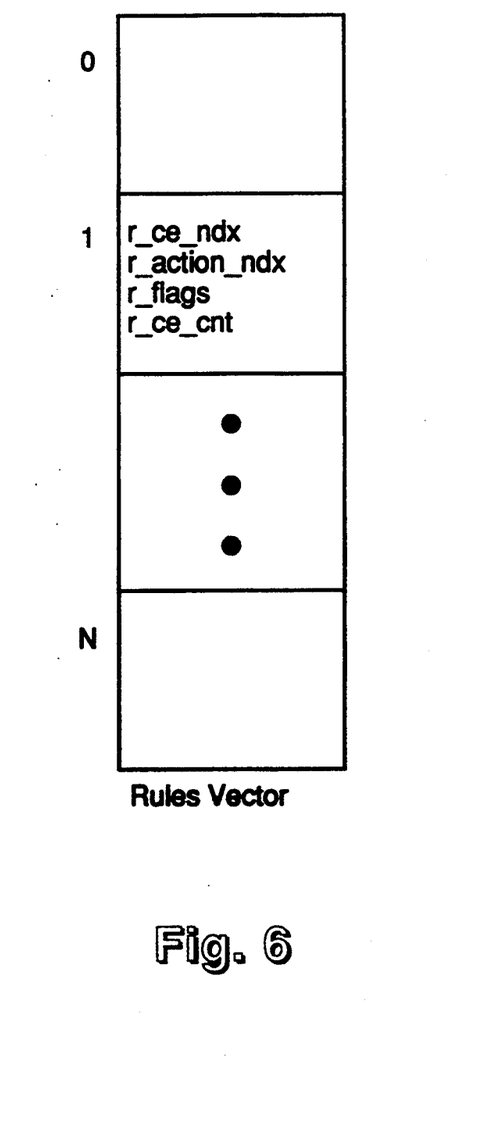
FIG. 6 is a diagram of a rules vector.

FIG. 6 is a diagram of the Rules class and vector. The rules vector contains a fixed number of instances of the Rules class. The number of instances is determined when the rule group is translated. The space for this vector is allocated when the private member function RuleSet::read_data() encounters the data record (A1) that holds the sizes for the vectors and tables, as determined by the translator.

The following list is of the private data members of the Rules class, whose instances make up this vector.

- The r_ce_ndx field is an index into a table called rs_ce_tbl, which is one of the private data elements in a Rule-Set class object. Starting at this index in rs_ce_tbl is a zero-terminated list of the condition element id's that make up the rule's premise. These id's are the index into the Condition Element vector, which derive from the rs_ces private data element in the Rule-Set class object.
- The r_action_ndx field is an index into a table called rs_action_tbl, which is one of the private data elements in the Rule-Set class object. At that index in rs_action_tbl is the address of the function that should be branched to in order to execute the action of this rule.
- The r_flags field contains bits used to represent the state of a flag.
- The r_ce_cnt field contains the count of the number of condition elements in the premise of the rule. This field helps differentiate which rule to try next when more than one rule is to be chosen from. The rule having the most condition elements tends to be the most specific, and therefore, tends to be the rule chosen to have its premise evaluated.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A computer implemented method of creating a system of rules for use on a computer having an object-oriented data domain comprising the steps of:
    compiling at least one rule having a premise and an action, wherein the premise references a user-defined class upon which the rule will inference;
    compiling a definition for said user-defined class, such that said user-defined class inherits from a working memory element class; and
    binding an inference class object to a rule, adding user-defined class instances to a working memory element class, and calling an inferencing process after a rule calling sequence has been inserted in the object-oriented domain, such that said rule calling sequence defines an inference class.

2. The computer-implemented method of claim 1, and further comprising the step of translating said rule to code in the language of said object-oriented language.

3. The computer implemented method of claim 2, and further comprising the step of translating said class header together with said rule.

4. The computer implemented method of claim 2, and further comprising the step of compiling said object-oriented programming and linking said translated rules with said compiled programming.

5. The computer implemented method of claim 1, wherein said step of compiling said rule includes compiling a condition element of said premise such that said condition element directly matches to instances of said user-defined class.

6. The computer implemented method of claim 1, wherein said step of compiling a rule includes defining the action of said rule in the same language as the said object-oriented data domain.

7. The computer implemented method of claim 1, and further comprising the step of compiling functions within the action part of said rule, such that said functions directly operate on instances of said user-defined class.

8. The computer implemented method of claim 1, wherein said step of compiling a rule calling sequence includes explicitly compiling a selected instance of said user-defined class for inferencing.

9. The computer implemented method of claim 1, wherein said step of inserting a rule calling sequence is performed in the syntax of the object-oriented language.

* * * * *